United States Patent
Wang et al.

(10) Patent No.: US 12,442,919 B2
(45) Date of Patent: Oct. 14, 2025

(54) PHOTOELECTRIC DETECTION AND ACQUISITION SYSTEM AND CENTROID DETECTION METHOD BASED ON SINGLE-PIXEL DETECTOR

(71) Applicant: HEFEI INSTITUTES OF PHYSICAL SCIENCE, CHINESE ACADEMY OF SCIENCES, Hefei (CN)

(72) Inventors: Yingjian Wang, Hefei (CN); Dongfeng Shi, Hefei (CN); Jian Huang, Hefei (CN); Ke'e Yuan, Hefei (CN); Linbin Zha, Hefei (CN)

(73) Assignee: HEFEI INSTITUTES OF PHYSICAL SCIENCE, CHINESE ACADEMY OF SCIENCES, Hefei (CN)

( * ) Notice: Subject to any disclaimer, the term of this patent is extended or adjusted under 35 U.S.C. 154(b) by 940 days.

(21) Appl. No.: 17/628,631

(22) PCT Filed: May 14, 2021

(86) PCT No.: PCT/CN2021/093879
§ 371 (c)(1),
(2) Date: Jan. 20, 2022

(87) PCT Pub. No.: WO2021/228235
PCT Pub. Date: Nov. 18, 2021

(65) Prior Publication Data
US 2022/0365211 A1    Nov. 17, 2022

(30) Foreign Application Priority Data
May 15, 2020    (CN) .......................... 202010412816.0

(51) Int. Cl.
*G01S 17/06*    (2006.01)
*G01S 7/481*    (2006.01)

(52) U.S. Cl.
CPC ............ *G01S 17/06* (2013.01); *G01S 7/4816* (2013.01)

(58) Field of Classification Search
CPC ........ G01S 17/89; G01S 7/481; G01S 7/4816; G01S 7/4817; G01S 17/931;
(Continued)

(56) References Cited

U.S. PATENT DOCUMENTS

| 10,197,677 B1 * | 2/2019 | Crawford .............. F41G 7/2293 |
| 10,394,103 B2 * | 8/2019 | Hyde ...................... G01S 17/66 |

(Continued)

FOREIGN PATENT DOCUMENTS

| CN | 102968801 A | 3/2013 |
| CN | 106405546 A * | 2/2017 ............. G01S 13/89 |

(Continued)

OTHER PUBLICATIONS

Patent Cooperation Treaty, International Searching Authority, Search Report for PCT/CN2021/093879, 3 pages, dated Jul. 26, 2021.

*Primary Examiner* — Michael P Stafira
(74) *Attorney, Agent, or Firm* — Viksnins Harris Padys Malen LLP

(57) ABSTRACT

A centroid detection method based on a single-pixel detector, including: S1: establishing a photoelectric detection and acquisition system, and generating three two-dimensional (2D) array matrices A, B and C; S2: generating, by letting element value of each column in the matrix A be the corresponding serial number of the column, element value of each row in the matrix B be the corresponding serial number of the row, and element value of the matrix C be 1, 2D modulation information having distribution of the matrices A, B and C; S3: modulating illumination light according to the mode of the 2D modulation information and projecting the illumination light to a target object or modulating, (Continued)

according to the mode of the 2D modulation information, an image formed by the target object; and S4: acquiring intensity value of target reflected light to obtain position parameter of the target centroid.

7 Claims, 5 Drawing Sheets

(58) Field of Classification Search
CPC ...... G01S 7/4802; G01S 17/10; G01S 17/894;
G01S 7/4814; G01S 7/484; G01S 7/4863;
G01S 7/4914; G01S 17/66; G01S 7/4815;
G01S 17/42; G01S 13/89; G01S 17/36;
G01S 17/86; G01S 7/4811; G01S 7/4865;
G01S 7/497; G01S 7/4861; G01S 17/06;
G01S 17/08; G01S 17/18; G01S 17/58;
G01S 17/88; G01S 19/42; G01S 7/487;
G01S 7/4911; G01S 17/46; G01S 7/4808;
G01S 17/87; G01S 5/16; G01S 7/483;
G01S 7/4868; G01S 7/4873; G01S
7/4913; G01S 7/493; G01S 7/495; G01S
17/003; G01S 17/90; G01S 7/486
See application file for complete search history.

(56) References Cited

U.S. PATENT DOCUMENTS 10,655,982 B2 * 5/2020 Peng .................. G01C 21/3697
2007/0024839 A1 2/2007 Kawakami et al.

FOREIGN PATENT DOCUMENTS

| CN | 108564090 A | * | 9/2018 | ........... G06F 17/142 |
| CN | 108895985 A | * | 11/2018 | ........... G01B 11/002 |
| CN | 109151419 A | | 1/2019 | |
| CN | 110471082 A | * | 11/2019 | ............. G01S 17/89 |
| CN | 110672610 A | * | 1/2020 | |
| CN | 110703276 A | * | 1/2020 | ............. G01S 17/89 |
| CN | 111707413 A | | 9/2020 | |
| JP | H1026724 A | * | 1/1998 | |
| WO | WO-2016085571 A2 | * | 6/2016 | ............. A01K 61/95 |

* cited by examiner

PHOTOELECTRIC DETECTION AND ACQUISITION SYSTEM AND CENTROID DETECTION METHOD BASED ON SINGLE-PIXEL DETECTOR

CROSS REFERENCE TO RELATED APPLICATION(S)

The present application claims priority to the Chinese Patent Application No. 202010412816.0, filed with the China National Intellectual Property Administration (CNIPA) on May 15, 2020, and titled "CENTROID DETECTION METHOD BASED ON SINGLE-PIXEL DETECTOR", which is incorporated herein by reference in its entirety.

TECHNICAL FIELD

The present disclosure relates to the field of computational imaging, and in particular, to a photoelectric detection and acquisition system and a centroid detection method based on a single-pixel detector.

BACKGROUND TECHNOLOGY

Centroid detection is typically applied to motion tracking of target objects and Shack-Hartman sensors. In case of tracking a fast-moving target object, the centroid detection can capture a change of the centroid of the target object to work out a motion trajectory for the target object. However, in the Shack-Hartman sensors, the centroid of a spot is mainly acquired by a lenslet array and a charge coupled device (CCD) image sensor. The accuracy for acquiring the target centroid depends on the signal-to-noise ratio (SNR) at which the CCD image sensor acquires the target image. In some cases, for example, the signal light is weak with interference from strong background light, the SNR at which the conventional CCD image sensor acquires the target image is greatly reduced, affecting the accuracy for detecting the target centroid. In recent years, an emerging imaging method called single-pixel imaging (SPI) has received more and more attentions of the researchers and scholars. It is implemented by illuminating an object with a light field of spatio-temporal transformation, sampling physical information only through a single-pixel detector, and acquiring target information with a corresponding algorithm. With a strong light sensitivity and a wide spectral response range, the single-pixel detector has great prospects for application in fields such as weak light imaging and invisible light imaging. However, there haven't been any reports so far on how to directly detect the centroid of the target object with SPI.

SUMMARY

In order to detect a target centroid with SPI, the present disclosure provides a photoelectric detection and acquisition system and a centroid detection method based on a single-pixel detector.

To implement the above objective, the present disclosure provides the following solutions:

A photoelectric detection and acquisition system includes: a light generation component, a digital micromirror device (DMD), a lens, a photodetector that are arranged along a light path and a data acquisition unit, where the light generation component generates three two-dimensional (2D) array matrices A, B and C.

A centroid detection method based on a single-pixel detector, which is implemented based on the photoelectric detection and acquisition system, includes the following steps:

S1: establishing the photoelectric detection and acquisition system, where the light generation component in the photoelectric detection and acquisition system generates three 2D array matrices A, B and C;

S2: generating, by letting element value of each column in the matrix A be the corresponding serial number of the column, element value of each row in the matrix B be the corresponding serial number of the row, and element value of the matrix C be 1, 2D modulation information having distribution of the matrices A, B and C;

S3: modulating illumination light according to the mode of the 2D modulation information and projecting the illumination light to a target object or modulating, according to the mode of the 2D modulation information, an image formed by the target object; and S4: acquiring intensity value of target reflected light with the data acquisition unit in the photoelectric detection and acquisition system, and substituting the intensity value into a centroid solving algorithm to obtain position parameter of the target centroid.

As a first solution of the photoelectric detection and acquisition system, the photoelectric detection and acquisition system may include the light generation component, the DMD, the lens, the photodetector and the data acquisition unit, where a light beam of the light generation component is projected to the DMD, light modulated by the DMD is projected to the target object through the lens, a light signal reflected by the target object is converted by the photodetector into an electrical signal, and the electrical signal is sent to the data acquisition unit.

As a second solution of the photoelectric detection and acquisition system, the photoelectric detection and acquisition system may include the light generation component, the DMD, the lens, the photodetector and the data acquisition unit, where a light beam of the light generation component is projected to the target object, light reflected by the target object is projected to the DMD through the lens, a light signal modulated by the DMD is converted by the photodetector into an electrical signal, and the electrical signal is sent to the data acquisition unit.

Specifically, step S2 may be implemented by letting the element values of the matrices A, B and C in the 2D modulation information meet the following equations respectively: $S_1(x,y)=x$, $S_2(x,y)=y$ and $S_3(x,y)=1$, where a function $S(x,y)$ represents an element value corresponding to a coordinate $(x,y)$ in a 2D matrix.

Specifically, step S4 may specifically include the following steps:

S41: acquiring intensity value of reflected light of the target object with the data acquisition unit from the following equations:

$$I_1 = \sum_{x,y} f(x, y) \cdot S_1(x, y), I_2 = \sum_{x,y} f(x, y) \cdot S_2(x, y) \text{ and}$$

$$I_3 = \sum_{x,y} f(x, y) \cdot S_3(x, y),$$

where $f(x,y)$ is 2D distribution function of the target object or the image formed by the target object, and each of $I_1$, $I_2$ and $I_3$ is the intensity value acquired with the data acquisition unit; and S42: substituting the intensity value into the centroid solving algorithm to obtain an equation on the centroid position of the target object: $x_c=I_1/I_3$, and $y_c=I_2/I_3$, where $(x_c, y_c)$ is the position coordinate of the target centroid.

Based on specific embodiments provided in the present disclosure, the present disclosure discloses the following technical effects:

The photoelectric detection and acquisition system and the centroid detection method based on a single-pixel detector provided by the present disclosure can detect the position parameter of the target centroid by fusing the SPI and the centroid detection, thereby providing a novel method for the centroid detection field. Particularly for some wavebands which cannot be responded by an area-array detector or are not cost-effective, the present disclosure promotes actual applications of the centroid detection.

BRIEF DESCRIPTION OF THE DRAWINGS

To describe the technical solutions in the embodiments of the present disclosure or in the current technology more clearly, the accompanying drawings required for the embodiments are briefly described below. Apparently, the accompanying drawings in the following description show merely some embodiments of the present disclosure, and a person of ordinary skill in the art may still derive other accompanying drawings from these accompanying drawings without creative efforts.

DETAILED DESCRIPTION OF THE EMBODIMENTS

The technical solutions of the embodiments of the present disclosure are clearly and completely described below with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

An objective of the present disclosure is to provide a photoelectric detection and acquisition system and a centroid detection method based on a single-pixel detector, to detect a target centroid with SPI.

To make the above-mentioned objectives, features, and advantages of the present disclosure clearer and more comprehensible, the present disclosure will be further described in detail below with reference to the accompanying drawings and the specific implementations.

Figure 5:
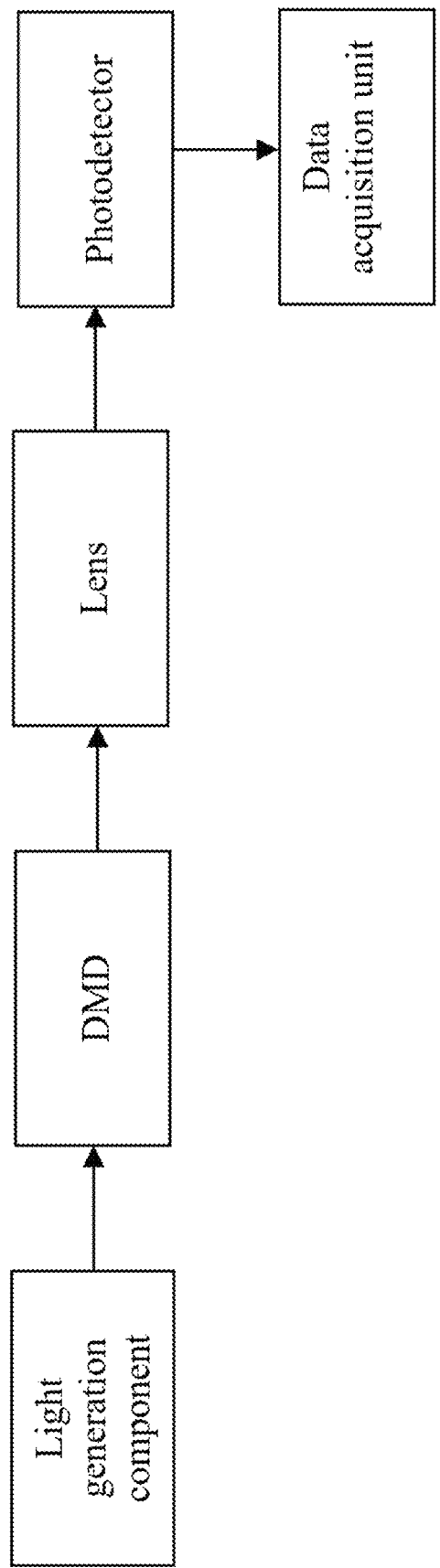
FIG. 5 shows a photoelectric detection and acquisition system provided by the present disclosure.

As shown in FIG. 5, a photoelectric detection and acquisition system provided by the present disclosure includes: a light generation component, a DMD, a lens, a photodetector that are arranged along a light path and a data acquisition unit that is coupled to the photodetector, where the light generation component generates three 2D array matrices A, B and C.

Figure 1:
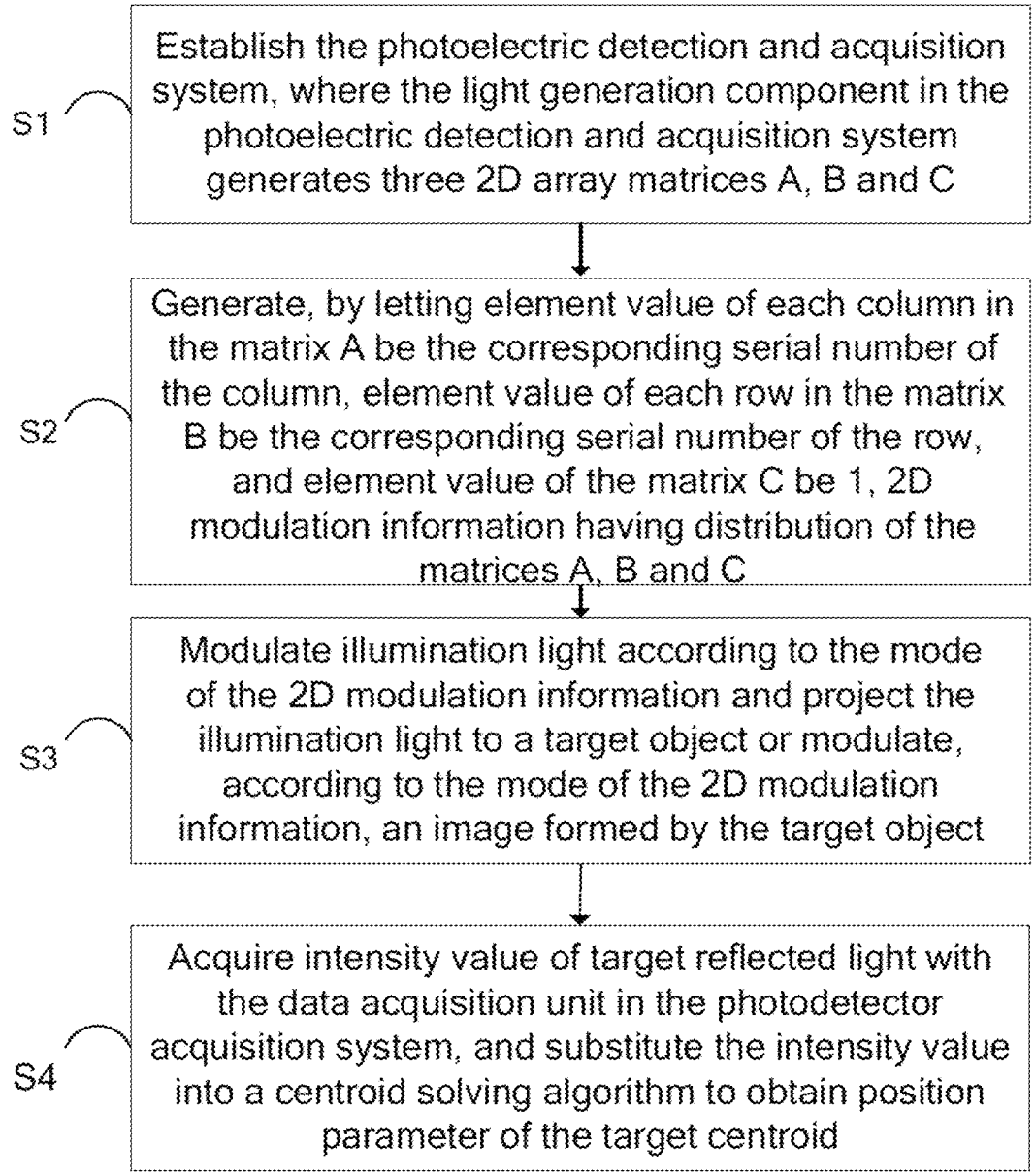
FIG. 1 shows a flow chart for detecting a centroid with SPI.

A centroid detection method based on a single-pixel detector, which is implemented based on the photoelectric detection and acquisition system, includes the following steps as shown in FIG. 1:

S1: Establish the photoelectric detection and acquisition system, where the light generation component in the photoelectric detection and acquisition system generates three 2D array matrices A, B and C.

There are two solutions for the photoelectric detection and acquisition system:

First Solution

The photoelectric detection and acquisition system includes the light generation component, the DMD, the lens, the photodetector and the data acquisition unit, where a light beam of the light generation component is projected to the DMD, light modulated by the DMD is projected to the target object through the lens, a light signal reflected by the target object is converted by the photodetector into an electrical signal, and the electrical signal is sent to the data acquisition unit.

Second Solution

The photoelectric detection and acquisition system includes the light generation component, the DMD, the lens, the photodetector and the data acquisition unit, where a light beam of the light generation component is projected to the target object, light reflected by the target object is projected to the DMD through the lens, a light signal modulated by the DMD is converted by the photodetector into an electrical signal, and the electrical signal is sent to the data acquisition unit.

Figure 2:
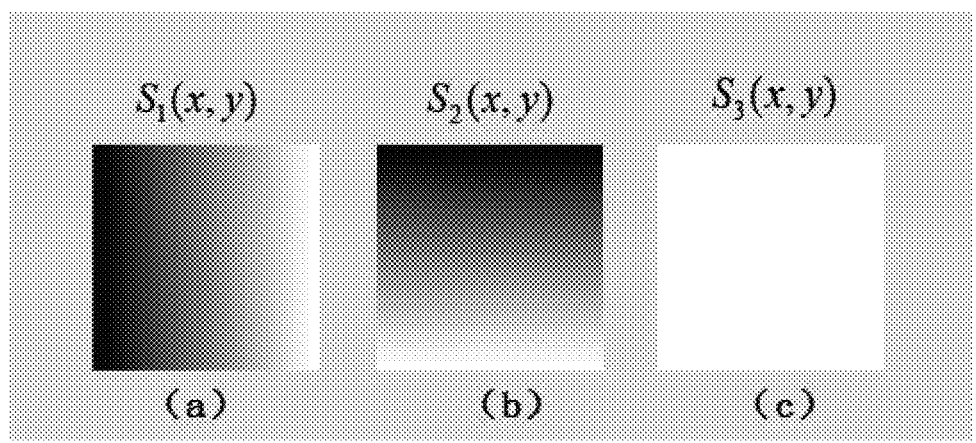
FIG. 2 shows a 2D projection pattern generated according to a specific implementation of the present disclosure, where, the (a) in FIG. 2 is a 2D projection pattern of a matrix A; the (b) in FIG. 2 is a 2D projection pattern of a matrix B; and the (c) in FIG. 2 is a 2D projection pattern of a matrix C.

S2: Generate, by letting element value of each column in the matrix A be the corresponding serial number of the column, element value of each row in the matrix B be the corresponding serial number of the row, and element value of the matrix C be 1, 2D modulation information having distribution of the matrices A, B and C, where three 2D projection patterns are as shown in (a), (b) and (c) in FIG. 2. Specifically, let the element values of the 2D matrices A, B and C meet the following equations respectively: $S_1(x,y)=x$, $S_2(x,y)=y$ and $S_3(x,y)=1$, where a function $S(x,y)$ represents an element value corresponding to a coordinate $(x,y)$ in a 2D matrix.

S3: Modulate illumination light according to the mode of the 2D modulation information and project the illumination light to a target object when the first solution of the photoelectric detection and acquisition system is used; or modulate, according to the mode of the 2D modulation information, an image formed by the target object when the second solution of the photoelectric detection and acquisition system is used.

S4: Acquire intensity value of target reflected light with the data acquisition unit in the photoelectric detection and acquisition system, and substitute the intensity value into a centroid solving algorithm to obtain the position parameter of a target centroid. Specifically, there are the following steps:

S41: Acquire intensity value of reflected light of the target object with the data acquisition unit from the following equations:

$$I_1 = \sum_{x,y} f(x, y) \cdot S_1(x, y), I_2 = \sum_{x,y} f(x, y) \cdot S_2(x, y) \text{ and}$$

$$I_3 = \sum_{x,y} f(x, y) \cdot S_3(x, y),$$

where $f(x,y)$ is 2D distribution function of the target object, and each of $I_1$, $I_2$ and $I_3$ is the intensity value acquired with the photoelectric detection and acquisition system; and S42: Substitute the intensity value into the centroid solving algorithm to obtain an equation on the centroid position of the target object: $x_c = I_1/I_3$, and $y_c = I_2/I_3$, where $(x_c, y_c)$ is the position coordinate of the target centroid.

In order to obtain the position parameter of the target centroid, the target centroid is calculated as follows:

$$x_c = \frac{I_1}{I_3} = \frac{\sum_{x,y} f(x, y)x}{\sum_{x,y} f(x, y)}, \text{ and } y_c = \frac{I_2}{I_3} = \frac{\sum_{x,y} f(x, y)y}{\sum_{x,y} f(x, y)},$$

where, $(x_c, y_c)$ is the position coordinate of the centroid of the target object.

As can be seen from the above calculation process, the centroid of the target object can be directly obtained by the SPI, without pre-establishing the image of the target object.

Figure 3:
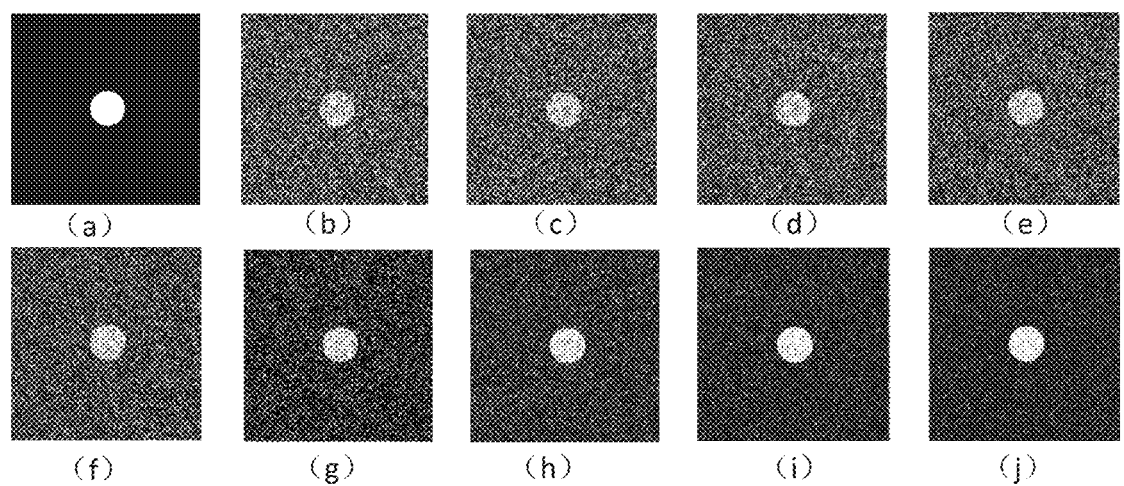
FIG. 3 shows a simulation result of a target centroid estimation error (CEE) detected with SPI, where, (a) in FIG. 3 is an original target image; (b) in FIG. 3 is a simulation result of a target CEE at an SNR of 0.5; (c) in FIG. 3 is a simulation result of a target CEE at an SNR of 1; (d) in FIG. 3 is a simulation result of a target CEE at an SNR of 1.5; (e) in FIG. 3 is a simulation result of a target CEE at an SNR of 2: (f) in FIG. 3 is a simulation result of a target CEE at an SNR of 3; (g) in FIG. 3 is a simulation result of a target CEE at an SNR of 5; (h) in FIG. 3 is a simulation result of a target CEE at an SNR of 7; (i) in FIG. 3 is a simulation result of a target CEE at an SNR of 9; and (j) in FIG. 3 is a simulation result of a target CEE at an SNR of 10.
Figure 4:
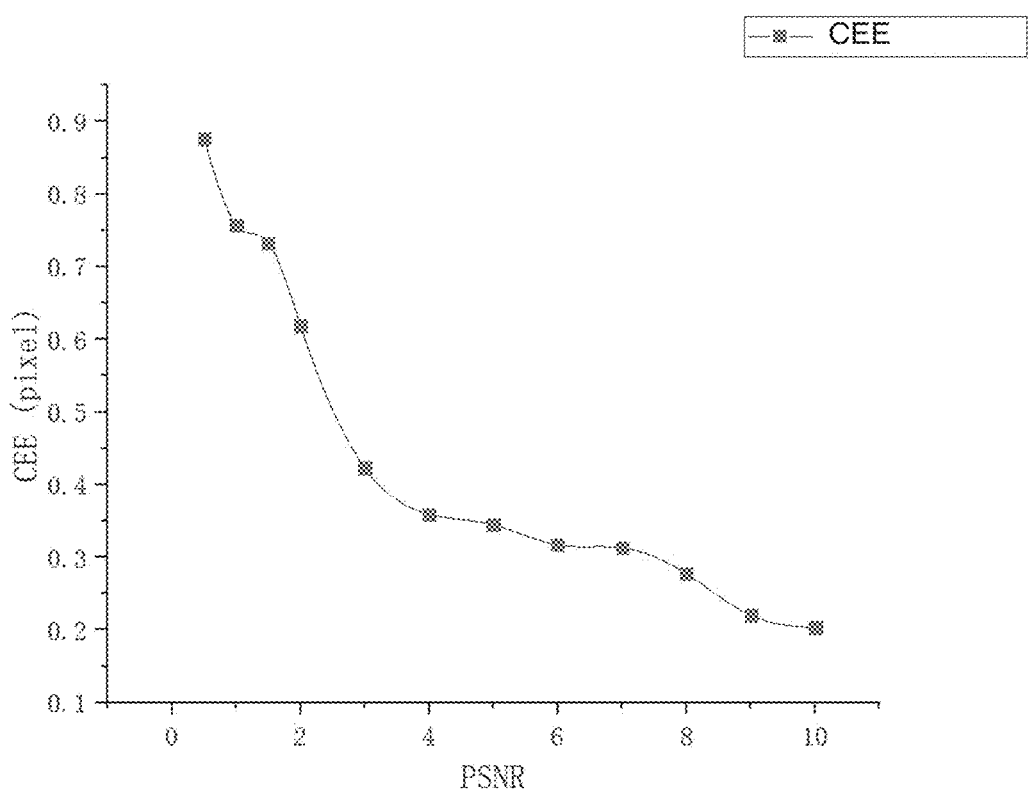
FIG. 4 shows a simulation curve of a target CEE detected with SPI.

In an implementation of the present disclosure, with a target image of M×N as an example, the relation between a CEE and a peak SNR (PSNR) is used to evaluate the accuracy of the method provided by the present disclosure. The CT and the PSNR are respectively calculated with the following equations:

$$CEE = \sqrt{(x_c - x_0)^2 + (y_c - y_0)^2}$$

$$PSNR = 10\log_{10}\left(\frac{MAX^2}{MSE}\right)$$

$$MSE = \frac{1}{MN}\sum_{i=1}^{M}\sum_{j=1}^{N}[f(i, j) - K(i, j)]^2$$

where, CEE is the centroid estimation error, MAX is a maximum grayscale value in the target image, MSE is a mean square error, and $x_0$ and $y_0$ are true centroid position of the object in simulation. CEEs at different SNRs are shown in (a)-(j) in FIG. 3. A linear graph in FIG. 4 is obtained according to multiple sets of data. As can be seen from FIG. 4, the CEE can still be stabilized within one pixel even at a low SNR in the SPI; and while the PSNR increases, the CEE decreases slowly to improve the accuracy.

Each embodiment of the present specification is described in a progressive manner, each embodiment focuses on the difference from other embodiments, and the same and similar parts between the embodiments may refer to each other. Since the system disclosed in the embodiments corresponds to the method disclosed in the embodiments, the description is relatively simple, and reference can be made to the method description.

In this specification, several specific embodiments are used for illustration of the principles and implementations of the present disclosure. The description of the foregoing embodiments is used to help illustrate the method of the present disclosure and the core ideas thereof. In addition, those of ordinary skill in the art can make various modifications in terms of specific implementations and the scope of application in accordance with the ideas of the present disclosure. In conclusion, the content of this specification shall not be construed as a limitation to the present disclosure.

What is claimed is:

1. A centroid detection method based on a single-pixel detector, comprising the following steps:
   S1: establishing a photoelectric detection and acquisition system, wherein the photoelectric detection and acquisition system comprises a light generation component, a digital micromirror device (DMD), a lens, a photodetector that are arranged along a light path and a data acquisition unit that is coupled to the photodetector, and the light generation component in the photoelectric detection and acquisition system generates three two-dimensional (2D) array matrices A, B and C;
   S2: generating, by letting element value of each column in the matrix A be the corresponding serial number of the column, element value of each row in the matrix B be the corresponding serial number of the row, and element value of the matrix C be 1, 2D modulation information having distribution of the matrices A, B and C;
   S3: modulating illumination light according to the mode of the 2D modulation information and projecting the illumination light to a target object or modulating, according to the mode of the 2D modulation information, an image formed by the target object; and
   S4: acquiring intensity value of target reflected light with the data acquisition unit in the photoelectric detection and acquisition system, and substituting the intensity value into a centroid solving algorithm to obtain position parameter of the target centroid.

2. The centroid detection method based on a single-pixel detector according to claim 1, wherein a light beam of the light generation component is projected to the DMD, and light modulated by the DMD is projected to the target object through the lens; and a light signal reflected by the target object is converted by the photodetector into an electrical signal, and the electrical signal is sent to the data acquisition unit.

3. The centroid detection method based on a single-pixel detector according to claim 1, wherein a light beam of the light generation component is projected to the target object, and light reflected by the target object is projected to the DMD through the lens; the DMD modulates received light to generate a light signal and transmits the light signal to the photodetector; and the photodetector converts the light signal into an electrical signal and sends the electrical signal to the data acquisition unit.

4. The centroid detection method based on a single-pixel detector according to claim 2, wherein step S2 is implemented by letting the element values of the matrices A, B and C in the 2D modulation information meet the following equations respectively: $S_1(x,y)=x$, $S_2(x,y)=y$ and $S_3(x,y)=1$, wherein a function $S(x,y)$ represents an element value corresponding to a coordinate (x,y) in a 2D matrix.

5. The centroid detection method based on a single-pixel detector according to claim 4, wherein step S4 specifically comprises the following steps:

S41: acquiring intensity value of reflected light of the target object with the data acquisition unit from the following equations:

$$I_1 = \sum_{x,y} f(x,y) \cdot S_1(x,y), \quad I_2 = \sum_{x,y} f(x,y) \cdot S_2(x,y) \text{ and}$$

$$I_3 = \sum_{x,y} f(x,y) \cdot S_3(x,y),$$

wherein $f(x,y)$ is 2D distribution function of the target object or the image formed by the target object, and each of $I_1$, $I_2$ and $I_3$ is the intensity value acquired with the data acquisition unit; and S42: substituting the intensity value into the centroid solving algorithm to obtain an equation on the centroid position of the target object: $x_c = I_1/I_3$ and $y_c = I_2/I_3$, wherein $(x_c, y_c)$ is the position coordinate of the target centroid.

6. The centroid detection method based on a single-pixel detector according to claim 3, wherein step S2 is implemented by letting the element values of the matrixes A, B and C in the 2D modulation information meet the following equations respectively: $S_1(x,y)=x$, $S_2(x,y)=y$ and $S_3(x,y)=1$, wherein a function $S(x,y)$ represents an element value corresponding to a coordinate (x,y) in a 2D matrix.

7. The centroid detection method based on a single-pixel detector according to claim 6, wherein step S4 specifically comprises the following steps:

S41: acquiring intensity value of reflected light of the target object with the data acquisition unit from the following equations:

$$I_1 = \sum_{x,y} f(x,y) \cdot S_1(x,y), \quad I_2 = \sum_{x,y} f(x,y) \cdot S_2(x,y) \text{ and}$$

$$I_3 = \sum_{x,y} f(x,y) \cdot S_3(x,y),$$

wherein $f(x,y)$ is 2D distribution function of the target object or the image formed by the target object, and each of $I_1$, $I_2$ and $I_3$ is the intensity value acquired with the data acquisition unit; and S42: substituting the intensity value into the centroid solving algorithm to obtain an equation on the centroid position of the target object: $x_c = I_1/I_3$ and $y_c = I_2/I_3$, wherein $(x_c, y_c)$ is the position coordinate of the target centroid.

* * * * *